United States Patent
Hsiung et al.

(10) Patent No.: US 9,219,742 B2
(45) Date of Patent: Dec. 22, 2015

(54) TRANSFORMING USER-INPUT DATA IN SCRIPTING LANGUAGE

(71) Applicant: International Business Machines Corporation, Armonk, NY (US)

(72) Inventors: Wei-Hsiang Hsiung, Taipei (TW); Cheng-Ta Lee, Taipei (TW); Wei-Shiau Suen, Taipei (TW); Rick M F Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 14/014,819

(22) Filed: Aug. 30, 2013

(65) Prior Publication Data

US 2014/0068771 A1    Mar. 6, 2014

(30) Foreign Application Priority Data

Aug. 31, 2012   (TW) ............... 101131966 A

(51) Int. Cl.
   *H04L 29/06*   (2006.01)
   *G06F 21/62*   (2013.01)
(52) U.S. Cl.
   CPC ............ *H04L 63/14* (2013.01); *G06F 21/6227* (2013.01); *H04L 29/06* (2013.01); *G06F 2221/031* (2013.01)
(58) Field of Classification Search
   USPC .................. 726/22, 23–26; 719/313; 717/141
   See application file for complete search history.

(56) References Cited

U.S. PATENT DOCUMENTS

| 7,860,842 | B2 | 12/2010 | Bronnikov et al. |
| 8,051,486 | B2 | 11/2011 | Beresniewicz |
| 8,353,035 | B1* | 1/2013 | Coomer et al. ................. 726/22 |
| 2008/0034424 | A1* | 2/2008 | Overcash et al. ............... 726/22 |
| 2009/0049547 | A1 | 2/2009 | Fan |
| 2009/0125976 | A1 | 5/2009 | Wassermann et al. |
| 2009/0328217 | A1 | 12/2009 | Markovich |
| 2011/0197177 | A1 | 8/2011 | Mony |

(Continued)

FOREIGN PATENT DOCUMENTS

| CN | 101901232 A | 12/2010 |
| TW | 200802029 A | 1/2008 |
| TW | 200845657 A | 11/2008 |

OTHER PUBLICATIONS

"Attacks on the System", http://www.cgisecurity.com/owasp/html/ch11s03.html, downloaded from the internet on Jul. 9, 2013, 10 pages.

(Continued)

*Primary Examiner* — Brandon Hoffman
*Assistant Examiner* — Samuel Ambaye
(74) *Attorney, Agent, or Firm* — Stephen R. Tkacs; Stephen J. Walder, Jr.; William J. Stock

(57) ABSTRACT

A mechanism for preventing injection attacks of scripting languages is provided. There is a mechanism of transforming user-input data in a scripting language included. The mechanism comprises a step of tracing a script instruction to separate instruction related variables and user-input related variables; and a step of encoding the user-input related variables into data belonging to safe-character-set area which do not include reserved character, and passing the encoded user-input related variables to a statement of the script instruction.

15 Claims, 7 Drawing Sheets

(56) References Cited

U.S. PATENT DOCUMENTS

2011/0252475 A1* 10/2011 Mui et al. .................. 726/23
2012/0117267 A1* 5/2012 Holloway et al. ............ 709/233

OTHER PUBLICATIONS

"SQL Injection", Wikipedia, http://en.wikipedia.org/wiki/SQL_injection, downloaded from the internet on Jul. 9, 2013, 9 pages.

Boyd, Stephen W. et al., "SQLrand: Preventing SQL Injection Attacks", Applied Cryptography and Network Security Lecture Notes in Computer Science, 2004, http://www1.cs.columbia.edu/~locasto/projects/candidacy/papers/boyd2004sqlrand.pdf , 11 pages.

Buehrer, Gregory T. et al., "Using Parse Tree Validation to Prevent SQL Injection Attacks", SEM 2005, Sep. 2005, Lisbon, Portugal, http://www.cse.ohio-state.edu/~paolo/research/publications/sem05.pdf, 8 pages.

Selvamani, K. et al., "A Novel Approach for Prevention of SQL Injection Attacks Using Cryptography and Access Control Policies", PEIE 2011, Second International Conference on Advances in Power Electronics and Instrumentation Engineering, Apr. 2011, 8 pages.

Tajpour, Atefeh et al., "Evaluation of SQL Injection Detection and Prevention Techniques", 2010 Second International Conference on Computational Intelligence, Communication Systems and Networks, Jul. 28-30, 2010, 6 pages.

* cited by examiner

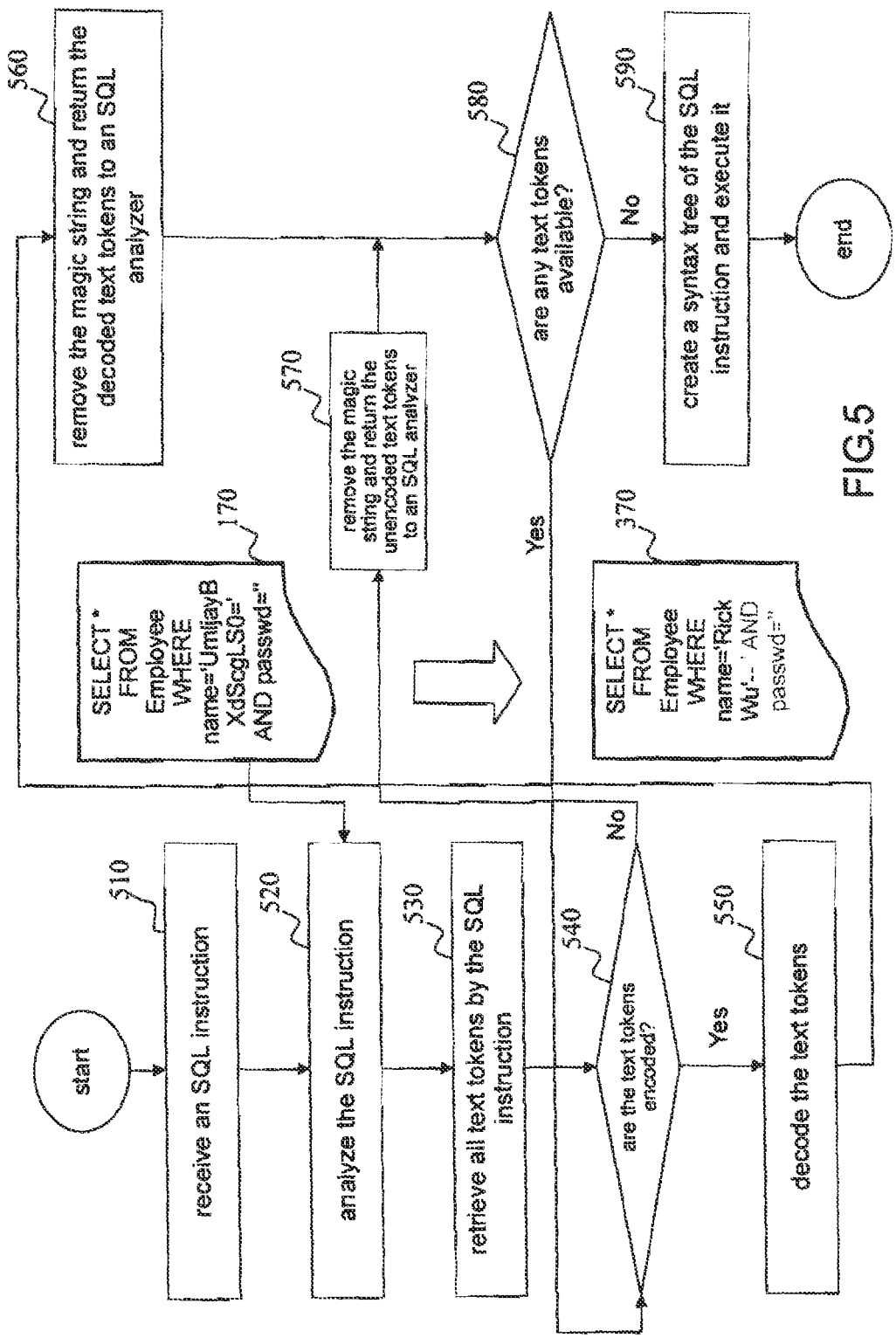

TRANSFORMING USER-INPUT DATA IN SCRIPTING LANGUAGE

BACKGROUND

The present invention relates to technology for preventing injection attacks of scripting languages, and more particularly, to a mechanism for preventing SQL injection attacks, including a mechanism for transforming user-input data in a scripting language, and a mechanism for analyzing a script instruction comprising encoded user-input related variables.

A structured query language (SQL) is a standard data query language for use in a database. SQL injection attacks happen as a result of security vulnerability at a database level of an application and thus often pose a threat to a web application. SQL injection attacks are usually targeted at a database through a Website.

FIG. 1a is a schematic view of the framework of a conventional system of accessing an SQL database by means of a webpage. A web client 110 comprises a browser, provides user-input data, and sends the user-input data to a web server 120. Conventional malicious users enter a fragment of an SQL instruction into the web client 110 in attempt to enable an SQL instruction which is new but is not expected by the program developer, that is, a rogue SQL query (or a SQL instruction), to be constructed when a web application in the web server 120 is interpreted, (for example, by downloading the contents of the database to the malicious users), and then send the SQL query from the web server 120 to an SQL server 130. The conventional malicious users enter a string carrying an SQL instruction, but the rogue application designed by the conventional malicious users misses out checking the string; as a result, the SQL instruction carried by the string is mistaken by a database server for a normal SQL instruction and executed, thereby damaging the database server 140. Scripting languages (also known as script languages, or scripting programming languages) similar to SQL, such as Python, Perl, Command line interface, Shell scripts, tool command language (TCL), Bash, and PHP (Personal Home Page or PHP: Hypertext Protocol), are subject to injection attacks in most cases.

An example for the causes of injection attacks is illustrated with FIG. 1b which shows that a username and a password are entered into an SQL database 140. A user enters the string "Rick Wu'--". As regards the string, (') and (--) are reserved characters in SQL syntax and represent "the preceding string ends" and "the following character is a comment", respectively. A web application 160 is interpreted by a script interpreter (such as JavaEE Runtime) of the web server 120 to thereby produce an SQL instruction 170 as follows:

SELECT*FROM Employee WHERE name='Rick Wu'--' AND passwd="

When the SQL server 130 executes the aforesaid SQL instruction, the reserved character (--) causes its subsequent character to be regarded as a comment ('AND passwd="). As a result, any password, entered is ignored, and in consequence malicious users can log in to the SQL database 140 directly. Hence, it is imperative to cope with SQL injection attacks.

For details of SQL injection attacks, visit the Open Web Application Security Project (OWASP) webpage or Wikipedia webpage.

To cope with the aforesaid SQL injection attacks, methods of detecting and preventing SQL injection attacks are disclosed, for example, in U.S. Pat. No. 7,860,842, US20080034424A1, and Tajpour, A, JorJor Zade Shooshtari, M., "EVALUATION OF SQL INJECTION DETECTION AND PREVENTION TECHNIQUES", Computational Intelligence, Communication Systems and Networks (CICSyN), 2010 Second International Conference on Issue Date: 28-30 Jul. 2010, pages: 216-221, at Location: Liverpool Print ISBN: 978-1-4244-7837-8.

SUMMARY

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in ail embodiments of the invention.

According to an embodiment, the present invention provides a method of transforming user-input data in a scripting language, the method comprising the steps of tracing a script instruction to separate the instruction related variables and user-input related variables; and encoding user-input related variables in the instruction into data belonging to a safe-character-set area not including reserved characters of the scripting language, and passing the encoded user-input related variables to a statement of the script instruction.

According to another embodiment of the present invention, the present invention provides a method of analyzing a script instruction comprising encoded user-input related variables, the method comprising the steps of retrieving all text tokens by the script instruction; checking and determining whether each said text token is encoded; decoding the text tokens and returning a decoded text token in response to an affirmative determination, or returning any unencoded one of the text tokens in response to a negative determination; and creating a syntax tree of the instruction based on the returned text tokens and executing the syntax tree of the instruction, after all the text tokens of the instruction have been checked.

According to another embodiment of the present invention, the present invention provides a computer program product stored on a computer-accessible medium, comprising a computer-readable program, and, when executed on a computer, performing the method of transforming user-input data in a scripting language.

According to another embodiment of the present invention, the present invention provides a computer system for transforming user-input data in a scripting language, the computer system comprising a host, comprising: a bus system; a memory connected to the bus system, wherein the memory comprises an instruction; and a processing unit connected to the bus system, wherein the processing unit executes the instruction to execute the method.

The following description, the appended claims, and the embodiments of the present invention further illustrate the features and advantages of the present invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

FIG. 5 is a flowchart of an SQL analyzer module according to an illustrative embodiment.

DETAILED DESCRIPTION OF THE EMBODIMENTS

Figure 1A:
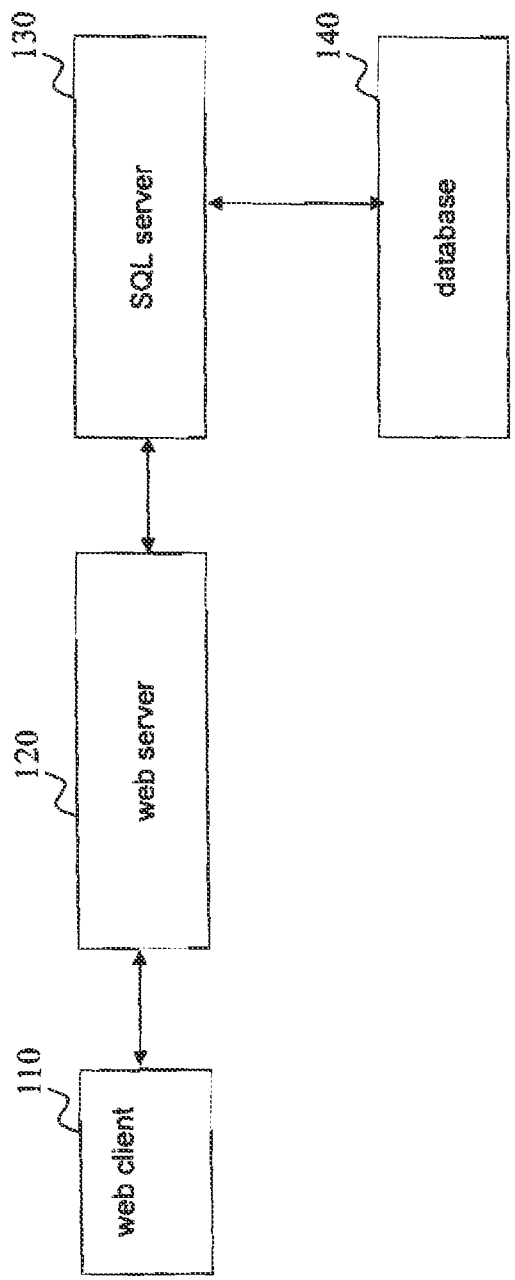
FIG. 1a is a schematic view of the framework of a conventional system of accessing an SQL database by means of a webpage.
Figure 1B:
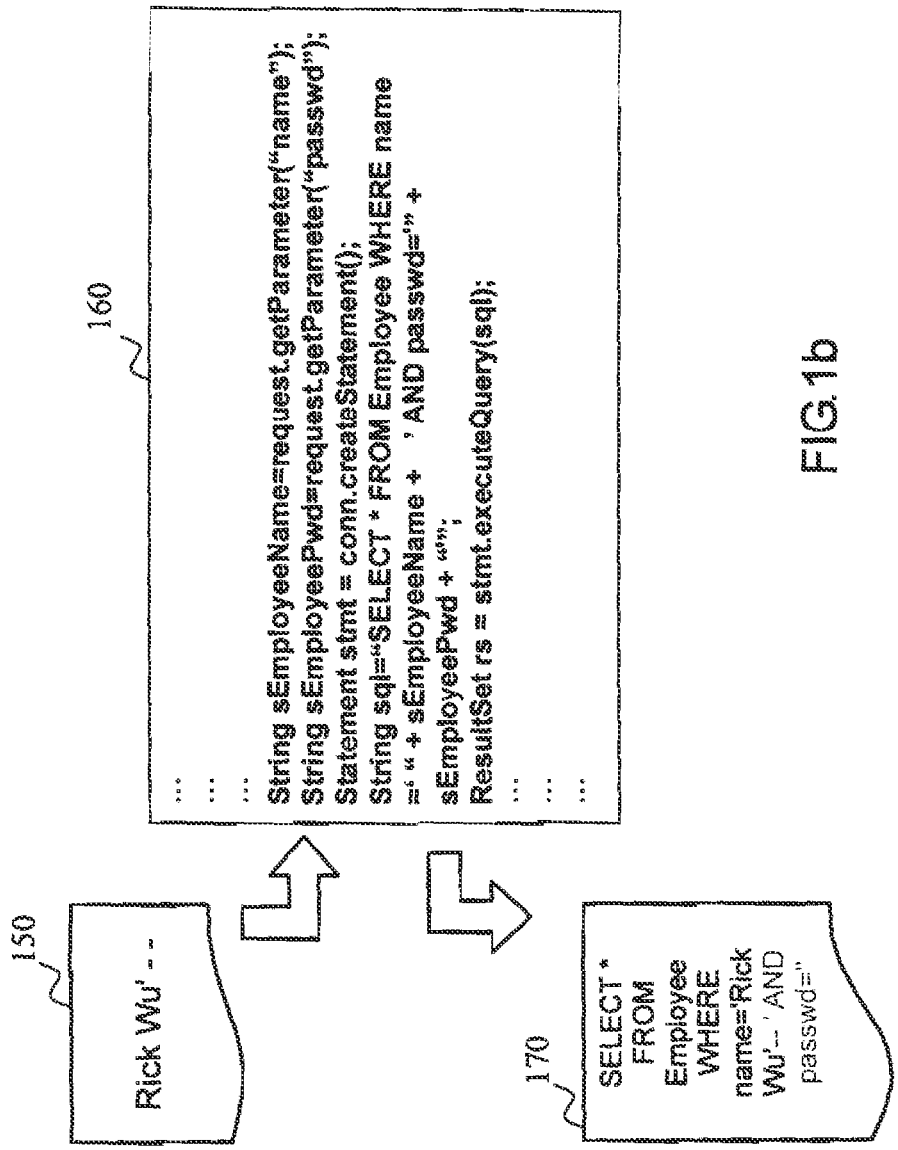
FIG. 1b illustrates an example of an injection attack that involves entering a username and a password of an SQL database.

Reference throughout this specification to "one embodiment," "an embodiment." or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored, in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded, onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 3a through FIG. 5, computer devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer System

Figure 2:
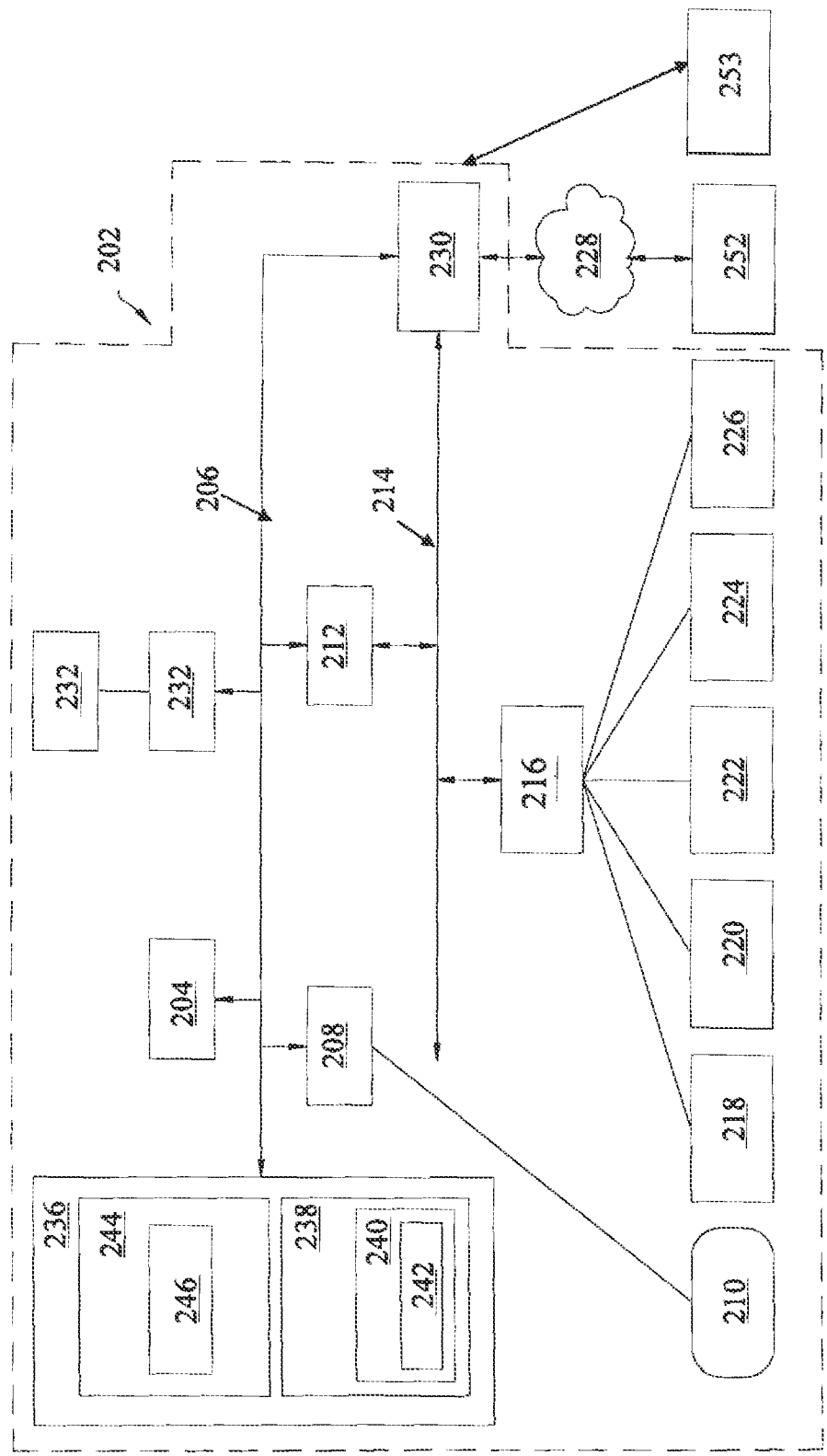
FIG. 2 is a block diagram of a hardware environment of an exemplary web server according to the illustrative embodiments.

FIG. 2 is a block diagram of an illustrative hardware environment of a web server 202 according to the illustrative embodiments. In an exemplary embodiment, a server is a universal desktop computer comprising: a processor for executing various applications; a storage device for storing various information and program code; a display device, a communication device, and an input/output device which function as interfaces for communicating with a user; and a peripheral component or other components serving a specific purpose. In another embodiment, the present invention is implemented in another way and thus having fewer or more other devices or components. The network can also be implemented in any form of a connection, including a fixed connection, such as a local area network (LAN) or a wide area network (WAN), or getting connected to the Internet through a dial-up connection provided by an Internet service provider (ISP). The network connection is not restricted to cable connection and wireless connection; instead, it can also be implemented by wireless connection in the form of a Global System for Mobile communications (GSM) connection or a Wi-Fi connection for communicating with a client computer. The network further comprises other hardware and software components (not shown), such as an additional computer system, router, and firewall.

As shown in FIG. 2, a server 202 includes a processor unit 204 coupled to a system bus 206. Also coupled to system bus 206 is a video adapter 208, which drives/supports a display 210. System bus 206 is coupled via a bus bridge 212 to an Input/Output (I/O) bus 214. Coupled to I/O bus 214 is an I/O interface 216, which affords communication with various I/O devices, including a keyboard 218, a mouse 220, a Compact Disk-Read. Only Memory (CD-ROM) 222, a floppy disk drive 224, and a flash drive memory 226, The format of the ports connected to I/O interface 216 may be any known to those skilled in the art of computer architecture, including but not limited to Universal Serial Bus (USB) ports.

The server 202 is able to communicate with a service provider server 252 via a network 228 using a network interface 230, which is coupled to system bus 206. Network 228 may be an external network such as the Internet, or an internal network such as an Ethernet or a Virtual Private Network (VPN). Using network 228, the server 202 is able to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes an operating system (OS) 238 and application programs 244.

OS 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present invention will equally well support other user interface modes, such as graphical, voice, gestural, etc. As depicted, OS 238 also includes kernel 242, which includes lower levels of functionality for OS 238, including providing essential services required by other parts of OS 238 and application programs 244, including memory management, process and task management, disk management, and mouse and keyboard management.

The hardware framework of a client computer or a SQL server is identical or similar to that of the server 202, or is any conventional basic framework, and the present invention is not limited thereto. For example, the client computer is a desktop computer, a notebook computer, a personal digital assistant (PDA), or a smartphone. However, FIG. 2 and the above examples are not restrictive of the present invention. The client computer comprises a browser. The browser comprises a program module and instructions. The program module and commands comply with the Hypertext Transfer Protocol (HTTP) whereby a World Wide Web (WWW) client (i.e., the client computer) sends and receives web-based messages through the Internet and communicate with the server 202.

An application 244 comprises an interpreter module 246 of the illustrative embodiments. The interpreter module 246 comprises a program module and instruction. The program module and instruction communicates with an SQL analyzer module in an SQL server 253. The interpreter module 246 and the SQL analyzer module come in the form of modules of an application or come in the form of a daemon. In another embodiment, the interpreter module 246 and the SQL analyzer module come in the form of programs. The interpreter module 246 and the SQL analyzer module comprise the code of programs illustrated with FIGS. 4, 5, respectively.

The hardware elements depicted in the server 202 are not intended to be exhaustive, but rather are representative to highlight essential components required by the present invention. For instance, the server 202 may include alternate memory storage devices such as magnetic cassettes, Digital Versatile Disks (DVDs), Bernoulli cartridges, and the like. These and other variations are intended to be within the spirit and scope of the present invention.

Figure 3A:
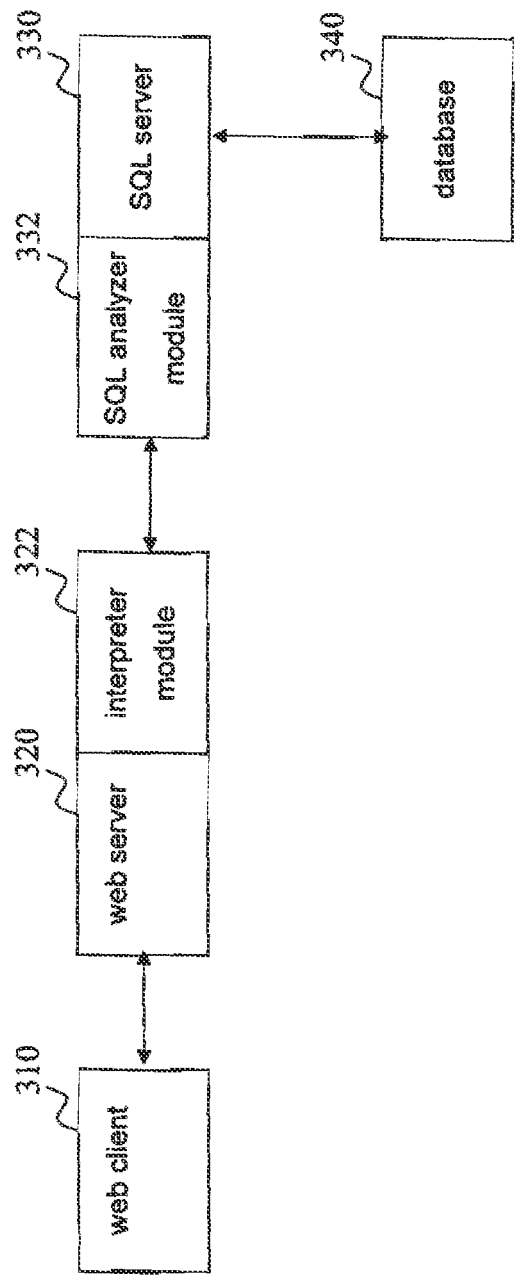
FIG. 3a is a schematic view of the framework of a system of accessing an SQL database by means of a webpage according to an illustrative embodiment.
Figure 3B:
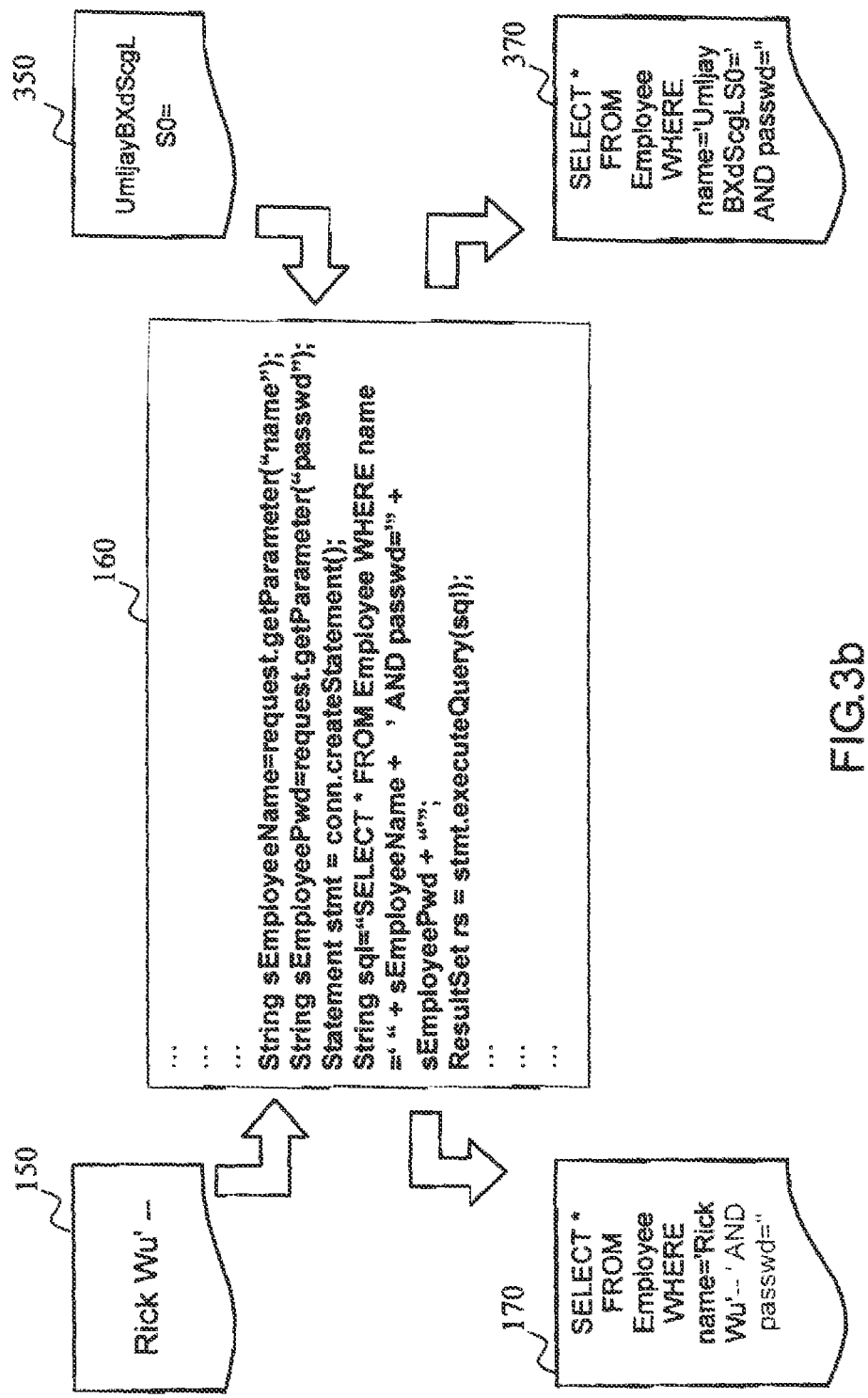
FIG. 3b illustrates an example of preventing an injection attack that involves entering of a username and a password of an SQL database according to an illustrative embodiment.

Referring to FIG. 3a, there is shown a schematic view of the framework of a system for accessing an SQL database through a webpage according to an illustrative embodiment. Referring to FIG. 3b, there is shown an example of preventing an injection attack that involves entering a username and a password of an SQL database according to an illustrative embodiment. A web client 310 comprises a browser, provides user-input data, and sends the user-input data to a web server 320. An interpreter module 322 in the web server 320 interprets a user-input data related web application. The interpreter module 322 further transforms the user-input data in the interpreted SQL instruction 170 by conventional Base64 encoding technology into data belonging to a safe-character-set area not including reserved characters.

Referring to FIG. 3b, a string 150 of "Rick Wu'--" entered by the user is transformed into a transformation string 350, "UmljayBXdScgLS0=" 350, Base64 encoding is an expression method based on 64 pieces of printable binary data. Hence, Base64 encoding transforms user-input data into data belonging to a safe-character-set area, so as to circumvent reserved characters of a scripting language. Base64 encoding is just illustrative of an embodiment of the present invention, and thus any other mean of encoding for transforming a character into one not including reserved characters of a scripting language is applicable to the present invention, such as DES. Afterward, an SQL instruction 370, which includes the transformed user-input data, is sent to the SQL server 330.

The SQL server 330 calls an SQL analyzer module 332 for analyzing the received the SQL instruction 370 which includes the transformed user-input data to become a syntax tree for execution and transforming the transformed user-input data into original user-input data. The interpreter module 322 and the SQL analyzer module 332 are further illustrated below in conjunction with FIG. 4 and FIG. 5.

Interpreter Module 322 Process Flow

Figure 4:
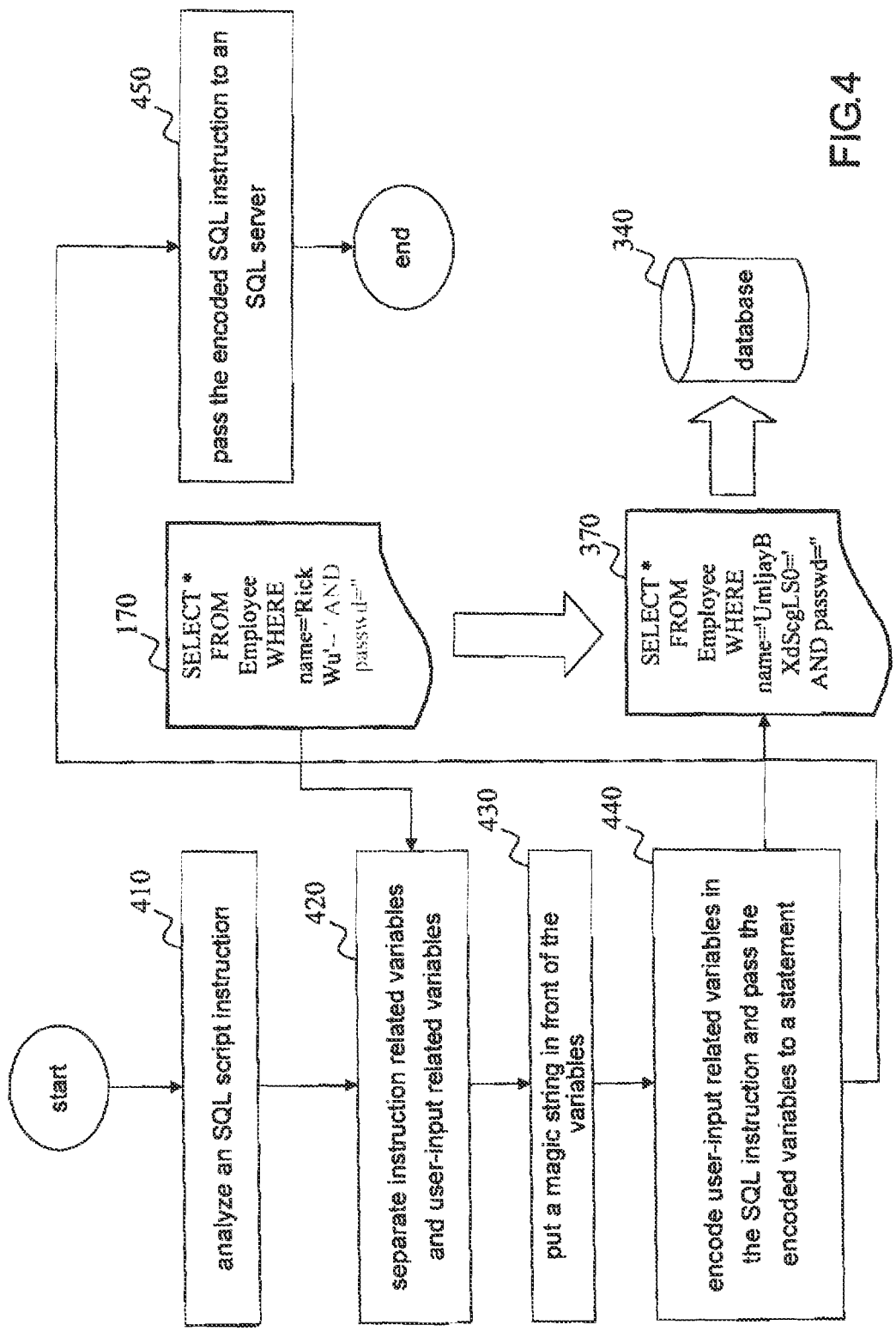
FIG. 4 is a flowchart of an interpreter module according to an illustrative embodiment.

Referring to FIG. 4, there is shown a flowchart of the interpreter module 322 according to an illustrative embodiment.

Step 410: the interpreter module 322 of the web server 320 analyzes the SQL instruction 170 of an interpretation.

Step 420: tracing the SQL instruction 170 to separate the instruction related variables and user-input related variables. Prior to the execution of the SQL instruction 170, each member in the SQL instruction 170 is known as a variable. For example, (SELECT), (*), (FROM), (Employee), (Rick Wu), ('), and (--) are referred to as variables.

Step 430: putting a magic string in front of the variables to enable retrospective operation. This step is optional.

Step 440: encoding user-input related variables in the SQL instruction by Base64 encoding technology, and passing the encoded user-input related variables to a statement of the SQL instruction, so as to generate the SQL instruction 370. As described above, any other way of encoding whereby a character is transformed into one not including a reserved character of a scripting language is applicable to the present invention.

Step 450: passing the SQL instruction 370 including encoded user-input related variables to the SQL server.

Flow Process of SQL Analyzer Module

FIG. 5 is a flowchart of the SQL analyzer module 332 according to an illustrative embodiment.

Step 510: the SQL analyzer module 332 of the SQL server 330 receives from the web server 320 the SQL instruction 370 comprising encoded user input related variables.

Step 520: analyzing the SQL instruction 370.

Step 530: retrieving all text tokens by the SQL instruction 370. From an analyzer's perspective, each member in the SQL instruction 370 is known as a text token. For example, (SELECT), (*), (FROM), (Employee) in the SQL instruction 370 are the text tokens defined herein.

Step 550: in step 540, each text token is checked and determined whether it is encoded. Decode the text token when the determination is affirmative.

Step 560: removing the magic string and returning the decoded text tokens to an SQL analyzer. If step 430 does not exist in the interpreter module, the step of removing the magic string will be omitted.

Step 570: if a text token examined in step 540 is not encoded, then remove the magic string and return the unencoded text token to an SQL analyzer. Likewise, if step 430 does not apply to the interpreter module, then there will not be any step of removing the magic string.

Step 580: go back to step 540, if there are still text tokens available for examination.

Step 590: after all the text tokens of the SQL instruction 370 have been examined, create a syntax tree of the original SQL instruction 170 and execute it.

No script languages (also known as scripting languages, or scripting programming languages) similar to SQL, such as Python, Perl, Command line interface, Shell scripts, TCL, Bash, and PHP, are immune from injection attacks. Hence, the disclosure contained in the present invention is applicable to any scripting languages.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method in a data processing system for transforming user input data in a scripting language, the method comprising:

tracing, by an interpreter module in a web server executing within the data processing system, a script instruction to separate instruction related variables and user-input related variables;

encoding by the interpreter module, user-input related variables in the instruction into data belonging to a safe-character-set area not including reserved characters of the scripting language, and passing the encoded user-input related variables to a statement of the script instruction to form an encoded script instruction; and providing, by the web server the encoded script instruction to a script server;

wherein the script server retrieves all text tokens in the encoded script instruction, checks and determines whether each text token is encoded, decodes each encoded text token and returns a decoded text token in response to an affirmative determination, returns any unencoded text tokens in response to a negative determination, creates a syntax tree of the instruction based on the returned text tokens, and executes the syntax tree of the instruction.

2. The method of claim 1, wherein the scripting language is a structured query language (SQL), and the script instruction is an SQL instruction.

3. The method of claim 1, wherein encoding the user-input related variables further comprise placing a magic string in front of the user-input variables to enable retrospective operation.

4. The method of claim 1, wherein the encoding is performed by Base64 or DES encoding.

5. A computer program product stored on a non-transitory computer-accessible medium, comprising a computer readable program, and, when executed on a computer, causes the computer to;

trace, by an interpreter module in a web server executing within the data processing system, a script instruction to separate instruction related variables and user input related variables;

encode, by interpreter module, user-input related variables in the instruction into data belonging to a safe-character-set area not including reserved characters of the scripting language, and pass the encoded user-input related variables to a statement of the script instruction to form an encoded script instruction; and provide by the web server the encoded script instruction to a script server;

wherein the script server retrieves all text tokens in the encoded script instruction, checks and determines whether each text token is encoded, decodes each encoded text token and returns a decoded text token in response to an affirmative determination, returns any unencoded text tokens in response to a negative determination, creates a syntax tree of the instruction based on the returned text tokens, and executes the syntax tree of the instruction.

6. A computer system for transforming user-input data in a scripting language, the computer system comprising:

a host, comprising:

a bus system;

a memory connected to the bus system; wherein the memory comprises an instruction; and a processing unit connected to the bus system, wherein the processing unit executes the instruction to:

trace, by an interpreter module in a web server executing within the data processing system, a script instruction to separate instruction related variables and user-input related variables;

encode, by interpreter module, user-input related variables in the instruction into data belonging to a safe- character-set area not including reserved characters of the scripting language, and pass the encoded user-input related variables to a statement of the script instruction to form an encoded script instruction; and provide, by the web server the encoded script instruction to a script server;

wherein the script server retrieves all text tokens in the encoded script instruction, checks and determines whether each text token is encoded, decodes each encoded text token and returns a decoded text token in response to an affirmative determination, returns any unencoded text tokens in response to a negative determination, creates a syntax tree of the instruction based on the returned text tokens, and executes the syntax tree of the instruction.

7. The method of claim 1, wherein the script server is a structured query language (SQL) server.

8. The computer program product of claim 5, wherein the scripting language is a structured query language (SQL), and the script instruction is an SQL instruction.

9. The computer program product of claim 5, wherein encoding the 'User-input related variables further comprise placing a magic string in front of the user-input variables to enable retrospective operation.

10. The computer program product of claim 5, wherein the encoding is performed by Base64 or DES encoding.

11. The computer system of claim 6, wherein the scripting language is a structured query language (SQL), and the script instruction is an SQL instruction.

12. The computer system of claim 6, wherein encoding the user input related variables further comprise placing a magic string in front of the user-input variables to enable retrospective operation.

13. The computer system of claim 6, wherein the encoding is performed by Base-64 or DES encoding.

14. The computer program product of claim 5, wherein the script server is a structured query language (SQL) server.

15. The computer system of claim 6, wherein the script server is a structured query language (SQL) server.

* * * * *